United States Patent [19]

Langsam

[11] Patent Number: 4,657,564
[45] Date of Patent: Apr. 14, 1987

[54] FLUORINATED POLYMERIC MEMBRANES FOR GAS SEPARATION PROCESSES

[75] Inventor: Michael Langsam, Allentown, Pa.

[73] Assignee: Air Products and Chemicals, Inc., Allentown, Pa.

[21] Appl. No.: 808,784

[22] Filed: Dec. 13, 1985

[51] Int. Cl.$^4$ .............................. B01D 53/22
[52] U.S. Cl. ......................... 55/16; 55/68; 55/158; 427/248.1; 428/442
[58] Field of Search ............ 55/16, 68, 158; 427/248.1, 400; 428/378, 394, 447

[56] References Cited

U.S. PATENT DOCUMENTS

| | | | |
|---|---|---|---|
| 3,770,567 | 11/1973 | Grot | 428/442 X |
| 3,902,947 | 9/1975 | Grot | 428/442 X |
| 3,988,491 | 10/1976 | Dixon et al. | 427/248.1 X |
| 4,020,223 | 4/1977 | Dixon et al. | 428/224 |
| 4,081,574 | 3/1978 | Hawkins et al. | 427/248.1 X |
| 4,144,374 | 3/1979 | Lagow et al. | 427/248.1 X |
| 4,268,279 | 5/1981 | Shindo et al. | 55/16 |
| 4,393,113 | 7/1983 | Sugie et al. | 55/16 X |
| 4,414,693 | 11/1983 | Brody | 55/16 X |
| 4,472,175 | 9/1984 | Malon et al. | 55/16 |
| 4,486,202 | 12/1984 | Malon et al. | 55/158 |

FOREIGN PATENT DOCUMENTS

| | | | |
|---|---|---|---|
| 62310 | 4/1984 | Japan | 55/158 |
| 78601 | 5/1985 | Japan | 55/158 |
| 132605 | 7/1985 | Japan | 55/158 |
| 143815 | 7/1985 | Japan | 55/158 |
| 212414 | 10/1985 | Japan | 55/158 |
| 35824 | 2/1986 | Japan | 55/158 |
| 2135319 | 8/1984 | United Kingdom . | |

OTHER PUBLICATIONS

S. S. Kulkarni et al., "Membrane Separation Processes for Acid Gases", No. 229, vol. 79, AIChE Symposium Series, Tutorial Lectures in Electrochemical Eng. and Tech.-II, pp. 172-178.

*Primary Examiner*—Robert Spitzer
*Attorney, Agent, or Firm*—Mark L. Rodgers; E. Eugene Innis; James C. Simmons

[57] ABSTRACT

The present invention is a treated, semi-permeable, polymeric membrane having improved selectivity for separating components of a gas mixture. The membrane is provided by fluorinating a polymer cast into membrane form, having the general structural formula:

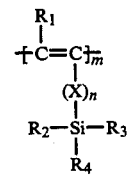

wherein $R_1$ is a linear or branched $C_1$–$C_4$ alkyl group; $R_2$ and $R_3$ are independently linear or branched $C_1$–$C_6$ alkyl groups; $R_4$ is a linear or branched $C_1$–$C_{12}$ alkyl or aryl group; X is a $C_1$–$C_3$ alkyl group or

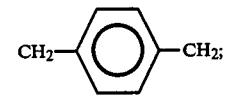

m is at least 100; and n is 0 or 1.

29 Claims, No Drawings

FLUORINATED POLYMERIC MEMBRANES FOR GAS SEPARATION PROCESSES

TECHNICAL FIELD OF THE INVENTION

The present invention relates to polymeric membranes which are used to separate components of a gas mixture. It also relates to gas separation processes using the polymeric membranes.

BACKGROUND OF THE INVENTION

A review of emerging technology using membranes to separate acid gases such as $CO_2$, $H_2S$ and $SO_2$ from gas streams is disclosed by S. Kulkarni, et al. in an article entitled, "Membrane Separation Processes for Acid Gases," AIChE Symposium Series (1983). Both currently available and potential polymer membranes for the separation of $CO_2$ from natural gas are disclosed. The permeation characteristics of various types of membranes, such as asymmetric cellulose esters, multicomponent polysulfone/silicon rubber, ultrathin polyetherimide, and ultrathin silicone rubber/polycarbonate, were calculated for $CO_2/CH_4$ gas mixtures.

U.S. Pat. No. 4,486,202 discloses gas separation membranes exhibiting improved gas separation selectivity. A preformed, asymmetrical gas separation membrane having selective permeation of at least one gas in a gaseous mixture over that of one or more remaining gases in the gaseous mixture, is contacted on one or both sides with a Lewis acid. Contacting the asymmetrical membrane with a Lewis acid results in improved separation factors for the permeating gases. The patent also discloses a method for producing improved, asymmetrical membranes in flat film or hollow fiber form having improved gas separation properties by treatment with a volatile Lewis acid.

U.S. Pat. No. 4,472,175 discloses gas separation membranes exhibiting improved gas separation selectivity. In this patent, a preformed, asymmetrical gas separation membrane, having selective permeation for at least one gas in a gaseous mixture over that of one or more remaining gases in a gaseous mixture, is contacted on one or both sides with a Bronsted-Lowry acid. Contacting the asymmetrical membrane with a Bronsted-Lowry acid results in improved separation factors for the permeating gases. Additionally, this patent discloses a method for producing improved, asymmetric membranes in flat film or hollow fiber form having improved gas separation properties by treatment with a Bronsted-Lowry acid.

U.K. patent application No. 2135319A discloses a membrane having improved permeability for a variety of gases. The membrane is formed from a polymer having repeating units of the formula:

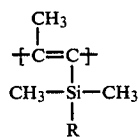

wherein R is an alkyl radical having 1–12 carbon atoms. The polymer is dissolved in one or more solvents, such as aliphatic hydrocarbons, to form a polymer solution which is cast to form a film. The membranes may be produced in any form, such as plain film, tubular and hollow fibrous forms and, if necessary, may be supported on one or more backing layers to form composites.

U.S. Pat. No. 4,020,223 discloses a method of modifying the surface of synthetic resins selected from the group consisting of polyolefins and polyacrylonitriles by treatment with a fluorine-containing gas. The fluorinated resin fibers exhibit good soil release and good water adsorption or moisture transport properties.

BRIEF SUMMARY OF THE INVENTION

The present invention is a treated, semi-permeable, polymeric membrane having improved selectivity for use in separating components of a feed gas mixture. The membrane is a polymer, cast into membrane form, having the general structural formula:

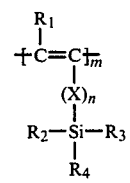

Wherein $R_1$ is a linear or branched $C_1$-$C_4$ alkyl group; $R_2$ and $R_3$ are independently linear or branched $C_1$-$C_6$ alkyl groups; $R_4$ is a linear or branched $C_1$-$C_{12}$ alkyl or aryl group; X is a $C_1$-$C_3$ alkyl group or

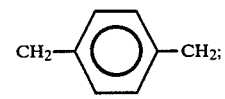

m is at least 100; and n is 0 or 1, which has been treated by contacting it with a reactive source of fluorine for a time sufficient to modify the membrane such that the $O_2/N_2$ selectivity ratio of the membrane is increased by at least 50% over that of the membrane prior to contact with the reactive fluorine source.

The present treated; i.e., fluorinated, polymeric membrane exhibits good gas permeability properties with a significant increase in gas selectivity over the unfluorinated polymer. Increased selectivity of the membrane is achieved for a wide variety of gas streams which contain at least two components having different permeability rates through the membrane.

The present invention is also a process for separating feed gas mixtures containing at least two components having different permeabilities through the membrane, by bringing said feed gas mixture into contact with a treated, semi-permeable, polymeric membrane as described above.

DETAILED DESCRIPTION OF THE INVENTION

The present invention is a treated, semi-permeable, polymeric membrane which exhibits both good permeability and high selectivity for a wide variety of gas mixtures. The membrane comprises a polymeric membrane which has been treated with a reactive source of fluorine to form an ultra thin, selective surface. The polymeric membrane has the general structural formula:

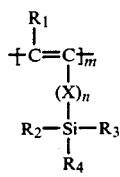

wherein $R_1$ is a linear or branched $C_1$-$C_4$ alkyl group; $R_2$ and $R_3$ are independently linear or branched $C_1$-$C_6$ alkyl groups; $R_4$ is a linear or branched $C_1$-$C_{12}$ alkyl or aryl group; X is a $C_1$-$C_3$ alkyl group or

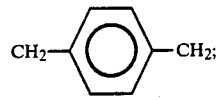

m is at least 100; and n is 0 or 1.

It is expected that other Group IV A metals, such as germanium, tin and lead may be substituted for silicon in the basic polymer structure and will perform in a similar fashion as that observed for the silicon in both the base polymer and in the reaction with the reactive fluorine source to form the selective coating.

The basic polymer can be produced by any conventional polymerization method which is capable of synthesizing this type of polymer, for example, by polymerizing monomer units in an organic solvent using a suitable catalyst such as $TaCl_5$, $MoCl_5$, $NbCl_5$, etc. While the polymer can have a wide range of molecular weights wherein m is at least 100, for handling and synthesis purposes it is preferred that m is less than 50,000. After it is synthesized, the polymer is cast into membrane form. The membrane form may be any conventional type of membrane, such as a flat sheet, hollow fibers or spiral wound flat sheets. In addition to self-supporting layers, the polymer may be cast onto a suitable support to form a composite structure.

The untreated polymeric membrane generally has high permeability values for a wide range of gases, but typically exhibits relatively poor gas selectivity and therefore is not suitable for many gas separation operations. To increase selectivity, after the polymer is cast into membrane form it is fluorinated by contacting it with a reactive fluorine source. One such fluorination method involves contacting the membrane with a gas stream containing between 0.01%–25% fluorine gas for a period of time between 10 seconds and 24 hours. Preferred fluorination techniques include a contact time between 0.5 and 120 minutes with a gas stream having a fluorine concentration between 0.1%–2% fluorine gas. In any case, fluorination should be sufficient to increase the $O_2/N_2$ selectivity ratio of the membrane at ambient temperature by at least 50%. A wide variety of fluorine-containing gas streams can be used to fluorinate the film, such as $F_2/O_2$, $F_2/N_2$, $F_2/Cl_2$, $F_2/O_2/N_2$, $F_2/Cl_2/N_2$, $F_2/SO_2/N_2$, $F_2/SO_3/N_2$, $F_2/SO_2Cl_2/N_2$ and $F_2/SO_2Cl/N_2$ etc. If a high concentration, i.e. 10%–25%, of fluorine is to be used in the fluorination step, the fluorine concentration should be incrementally staged-up slowly to avoid burning the membrane. In addition to the above-described gas-phase fluorination, other fluorination techniques can be used. For example, a liquid containing fluorinating agents may be either volatized into a reactive gas atmosphere or the membrane may be coated or dipped into a dilute solution of a fluorine containing agent followed by a gas phase volatilization. While both sides of the polymeric membrane can be subjected to the fluorine treatment, it is preferred that only one surface of the membrane be treated, thereby forming an ultra-thin selective surface only on that side of the membrane, with the remainder of the membrane consisting of the highly permeable polymeric structure.

The interaction between the silicon containing polymer and the reactive atmosphere can be carried out under ambient conditions of temperature and pressure. Alternatively, the reaction may also be performed at elevated temperatures and in the presence of a plasma field or electromagnetic radiation.

The fluorinated membrane exhibits greatly enhanced permselectivity for various gas mixtures, making it useful in many different gas separation operations. A gas stream containing two or more components is brought into contact with the membrane, and the permeate stream from the membrane is analyzed and measured to determine the permeability coefficient ($\bar{P}$) of the various gaseous components. Permeability coefficient can be measured by the following relationship:

$$\bar{P} = \frac{J}{1} \cdot \frac{1}{A} \cdot \frac{L}{1} \cdot \frac{1}{P} \cdot 10^{+10}$$

Where:
J is Flux
A is Area
L is Thickness
P is Pressure

This relationship can be conveniently expressed in units of measurement termed Barrers. The relationship for Barrers is:

$$\bar{P} \text{ in } \frac{scc}{sec} \cdot \frac{1}{cm^2} \cdot \frac{cm}{1} \cdot \frac{1}{cm(Hg)} \cdot 10^{+10}$$

Additionally, the permeance ($\bar{P}/L$), as defined by Henis and Tripodi in their paper on resistence models, J. Memb. Sci. 8, 223 (1981), of the composite structure is also measured taking into account the area of the ultra thin surface layer. By comparing the permability and-/or permeance values for different gaseous components, a selectivity ($\alpha$) ratio for various gas mixtures can be calculated. It was found that the treated membrane structure of the present invention significantly increased the selectivity ratios of a wide number of gas mixtures. Examples of such gas mixtures include: $He/CH_4$, $He/N_2$, $H_2/CH_4$, $H_2/CO$, $H_2/N_2$, $O_2/N_2$ and $CO_2/CH_4$. While the selectivity ratios of the above gas mixtures demonstrated a significant increase, it is expected that many other gas mixtures, both binary and multi-component mixtures, would also exhibit increased selectivity ratios.

Experimental: Synthesis of Poly Trimethyl Silyl Propyne (PTMSP)

100 grams of Toluene was mixed with $TaCl_5$ catalyst and stirred for about 5 minutes until it dissolved to form a bright yellow solution. About 25 grams of trimethyl silyl propyne (TMSP) monomer was added and the solution immediately turned dark brown. Within two hours there was a noticeable increase in solution viscosity. After 24 hours the reaction mixture was quenched in methanol, washed with about 1000 ml of methanol and then dried, leaving a PTMSP Polymer.

The polymer produced, polytrimethyl silyl propyne, (PTMSP), has the structure:

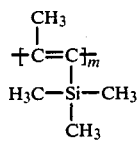

Wherein m is at least 100.

By varying the monomer (TMPS) to catalyst (TaCl$_5$) ratio, it was possible to control the molecular weight of the polymer. The yields and Brookfield viscosities of 1.7% toluene solutions of several of the polymers synthesized according to the above procedure are listed in Table 1 below:

TABLE 1

| PHYSICAL PROPERTIES OF PTMSP | | | | |
|---|---|---|---|---|
| | RUN NUMBER | | | |
| | 1 | 2 | 3 | 4 |
| M/C[1] | 25/1 | 100/1 | 100/1 | 200/1 |
| Yield (%) | 100% | 100% | 100% | 87% |
| Brookfield Viscosity[2] | 164 | 248 | 250 | 346 |

[1]M = Monomer; TMSP MW = 112.19
C = Catalyst; TaCl$_5$ MW = 357
M/C = Mole ratio of monomer to catalyst
[2]Brookfield viscosity in toluene @ 1.7% TS in centipoise Both flat sheet PTMSP membranes and PTMSP membranes coated on a porous hollow fiber substrate were fabricated by dissolving the polymer in toluene at a weight ratio of 1/40 to form a 2.5% solution by weight. A portion of the toluene-polymer solution was cast on a clean, smooth glass surface using a 40 mil. doctor knife, and air dried using a stream of dry nitrogen. The polymer film ranged from about 25-30 microns in total thickness. The flat sheet membranes were removed from the solid glass support by soaking in water. The films easily floated off of the glass surface. The flat sheet membranes were mounted in a CSC-135 Permeation Cell (manufactured by Custom Scientific Corporation, Whippany, NJ) using the procedure described in an article by S. A. Stern, et al. in *Modern Plastics*, October 1964.

The same toluene-polymer solution was used for coating Celgard ® polypropylene porous hollow fiber using grade #X-20 of Celgard ® material manufactured by Celanese Chemical Corporation. The Celgard ® hollow fibers were dipped into the toluene-polymer solution twice to insure complete coverage of the outer surface of the fiber.

Several of the PTMSP membranes while still attached to the glass supports, were fluorinated in a gas phase batch reactor with various fluorine/nitrogen mixtures. The membranes were placed in the reactor and the gas space was purged for 4 hours with nitrogen to remove ambient air. Pre-set ratios of F$_2$/N$_2$ were then flowed through the reactor space for predetermined periods of time.

Three PTMSP membranes were fluorinated for a period of five minutes using different fluorine gas concentrations. A study of the surface composition of the PTMSP membranes before and after fluorination indicates a drastic alteration in the surface of the membrane. The surface compositions of the three fluorinated membranes and one unflorinated PTMSP membrane were analyzed, and the results are reported in Table 2 below.

TABLE 2

| | MEMBRANE | | | |
|---|---|---|---|---|
| | Control | 1 | 2 | 3 |
| Fluorination Treatment | | | | |
| Nitrogen (cc/min) | 100 | 99.5 | 99.0 | 96.0 |
| Fluorine (cc/min) | 0 | 0.5 | 1.0 | 4.0 |
| Element Atomic % | | | | |
| Carbon | 86.0 | 49.0 | 49.2 | 49.1 |
| Silicon | 14.0 | 2.4 | 2.6 | 2.1 |
| Fluorine | — | 27.4 | 27.0 | 30.2 |
| Oxygen | — | 21.0 | 21.1 | 18.2 |

The surface analysis reported in Table 2 shows a significant decrease in both the carbon and silicon contents on the surface of the fluorinated membranes. It is postulated that the reduction of silicon on the surface of the fluorinated polymeric membranes is due to the formation of volatile silicon compounds, such as SiF$_4^-$, which are removed from the polymeric chain resulting in improved membrane selectivity.

Several other PTMSP membranes were synthesized and fluorinated in a gas phase batch reactor in accordance with the above procedures. The fluorine content of the treating gas stream ranged from 0.1-0.5% F$_2$ with total F$_2$ exposure ranging from 0.5-60 cc. Contact times of the membranes with the treating gas ranged from 1-60 min.

The fluorinated PTMSP membranes were recovered from the reactor and subsequently removed from the glass supports by a water wedge technique. The membranes were measured for total thickness and subsequently mounted in the CSC-135 Permeation Cells for gas permeability and selectivity studies.

Gas permeability and selectivity studies using the PTMSP membranes treated with various fluorine concentrations and contact times were carried out and are reported in the examples below. These examples are meant only to illustrate the present invention and are not meant to be limiting.

EXAMPLE 1

Two unfluorinated and nine fluorinated flat sheet PTMSP polymer membrane samples were mounted in separate CSC permeation cells such that pressurized gas mixtures could be passed over the membrane surface and the permeate stream could be measured on the permeate side of the membrane by a volumetric flow device.

The fluorinated samples differed in the fluorine concentration used as well as the contact time for fluorination. The permeability (P), permeance ($\overline{P}/L$), and selectivity ($\alpha$) of various gases through the membranes are reported in Tables 3 and 4 below.

TABLE 3

| | | | Permeability and Permeance | | | | | | | | |
|---|---|---|---|---|---|---|---|---|---|---|---|
| Membrane # | A | B | 1 | 2 | 3 | 4 | 5 | 6 | 7 | 8 | 9 |
| Thickness (cm) | 141.0[1] | 33.3[1] | 98.63[1] | 77.38[1] | 105.5[1] | 88.0[1] | 134.63[1] | 97.42[1] | 152.3[1] | 152.6[1] | 141.3[1] |
| Time (min) | | | 5 | 1 | 7.5 | 1.5 | 5 | 15 | 60 | 60 | 60 |

TABLE 3-continued

| | | | | | | Permeability and Permeance | | | | | |
|---|---|---|---|---|---|---|---|---|---|---|---|
| Membrane # Thickness (cm) | | A 141.0[1] | B 33.3[1] | 1 98.63[1] | 2 77.38[1] | 3 105.5[1] | 4 88.0[1] | 5 134.63[1] | 6 97.42[1] | 7 152.3[1] | 8 152.6[1] | 9 141.3[1] |
| cc/N$_2$/min | | | | 100 | 100 | 200 | 200 | 100 | 800 | 200 | 400 | 200 |
| cc/F$_2$/min | | | | .1 | 0.5 | 0.2 | 1.0 | 0.5 | 0.8 | 0.2 | 0.4 | 1.0 |
| F$_2$ % | | | | 0.1 | 0.5 | 0.1 | 0.5 | 0.5 | 0.1 | 0.1 | 0.1 | 0.5 |
| F$_2$ (cc Total) | | | | 0.5 | 0.5 | 1.5 | 1.5 | 2.5 | 12 | 12 | 24 | 60 |
| $\overline{P}$[2] and $\overline{P/l}$[3] | | | | | | | | | | | | |
| H$_2$ | ×10$^{+10}$ | 16189 | 16110 | 12543 | 14075 | 10151 | 10115 | 9968 | 6176 | 8169 | 4476 | 4878 |
| | ×10$^{+5}$ | | | 56.40 | 141.6 | 25.90 | 30.76 | 19.34 | 10.27 | 10.87 | 4.058 | 4.940 |
| He | ×10$^{+10}$ | 6756 | 6451 | 6052 | 6593 | 818 | 5876 | 6018 | 5122 | 5571 | 4915 | 4868 |
| | ×10$^{+5}$ | | | 61.36 | VL[4] | 51.61 | 68.18 | 58.71 | 24.60 | 25.26 | 13.12 | 13.63 |
| O$_2$ | ×10$^{+10}$ | 10228 | 9851 | 4333 | 4357 | 1963 | 1838 | 2374 | 967.8 | 1040 | 515.7 | 585.2 |
| | ×10$^{+5}$ | | | 7.729 | 9.948 | 2.313 | 2.557 | 2.309 | 1.099 | .7620 | .3577 | .4388 |
| N$_2$ | ×10$^{+10}$ | 6765 | 6724 | 1348 | 1318 | 413.3 | 410.3 | 552.8 | 211.4 | 201 | 128 | 119.9 |
| | ×10$^{+5}$ | | | 1.708 | 2.117 | .4173 | .4969 | .4473 | .2240 | .1360 | .08550 | .08485 |
| CH$_4$ | ×10$^{+10}$ | 15702 | 16296 | 1151 | 1283 | 196.3 | 261.4 | 311.5 | 115.3 | 90.4 | 97 | 44.7 |
| | ×10$^{+5}$ | | | 1.167 | 1.803 | .1884 | .3020 | .2314 | .1192 | .06969 | .06400 | .03172 |
| CO | ×10$^{+10}$ | 7752 | 7733 | 1767 | 1760 | 554 | 481.3 | 742.1 | 257.5 | 284.3 | 272.8 | 151.8 |
| | ×10$^{+5}$ | | | 2.321 | 2.927 | .5656 | .5832 | .6096 | .2734 | .1938 | .1853 | .1096 |
| CO$_2$ | ×10$^{+10}$ | 32084 | 34114 | 20449 | 20449 | 20257 | 9559 | 9687 | 3718 | 3860 | 3563 | 2120 |
| | ×10$^{+5}$ | | | 54.24 | 54.24 | 67.40 | 12.74 | 10.17 | 4.299 | 2.869 | 2.617 | 1.603 |

[1] ×10$^{-4}$
[2] Permeability Coefficient for the Composite Membrane (×10$^{+10}$)
[3] Permeance of the fluorinated surface layer (×10$^{+5}$)
[4] Very large

TABLE 4

| | | | | | | Selectivity | | | | | |
|---|---|---|---|---|---|---|---|---|---|---|---|---|
| Membrane # Thickness (cm) | | A 141.0[1] | B 33.3[1] | 1 98.63[1] | 2 77.38[1] | 3 105.5[1] | 4 88.0[1] | 5 134.63[1] | 6 97.42[1] | 7 152.3[1] | 8 152.6[1] | 9 141.3 |
| Time (min) | | | | 5 | 1 | 7.5 | 1.5 | 15 | 60 | 60 | 60 | 60 |
| cc/N$_2$/min | | | | 100 | 100 | 200 | 200 | 100 | 800 | 200 | 400 | 200 |
| cc/F$_2$/min | | | | .1 | 0.5 | 0.2 | 1.0 | 0.5 | 0.8 | 0.2 | 0.4 | 1.0 |
| F$_2$ % | | | | 0.1 | 0.5 | 0.1 | 0.5 | 0.5 | 0.1 | 0.1 | 0.1 | 0.5 |
| F$_2$ (cc Total) | | | | 0.5 | 0.5 | 1.5 | 1.5 | 2.5 | 12.0 | 12.0 | 24.0 | 60.0 |
| α | | | | | | | | | | | | |
| O$_2$/N$_2$ | ×10$^{+10(2)}$ | 1.51 | 1.47 | 3.21 | 3.31 | 4.75 | 4.48 | 4.29 | 4.58 | 5.17 | 4.03 | 4.88 |
| | ×10$^{+5(3)}$ | | | 4.53 | 4.70 | 5.54 | 5.15 | 5.16 | 4.91 | 5.60 | 4.18 | 5.18 |
| He/CH$_4$ | ×10$^{+10}$ | 0.43 | 0.35 | 5.26 | 5.00 | 14.1 | 14.3 | 19.3 | 44.4 | 61.6 | 50.7 | 109 |
| | ×10$^{+5}$ | | | 52.6 | VL[4] | 274 | 226 | 254 | 206 | 423 | 205 | 430 |
| H$_2$/CH$_4$ | ×10$^{+10}$ | 1.03 | 0.99 | 10.9 | 10.7 | 24.6 | 24.7 | 32.0 | 53.6 | 90.4 | 46.1 | 109 |
| | ×10$^{+5}$ | | | 48.3 | 78.5 | 137 | 102 | 83.6 | 86.2 | 182 | 63 | 156 |
| H$_2$/CO | ×10$^{+10}$ | 2.09 | 2.08 | 7.10 | 8.0 | 18.3 | 21.0 | 13.4 | 24.0 | 28.7 | 16.4 | 32.1 |
| | ×10$^{+5}$ | | | 24.3 | 48.5 | 45.8 | 52.7 | 31.7 | 37.6 | 56.1 | 21.9 | 45.1 |
| CO$_2$/CH$_4$ | ×10$^{+10}$ | 2.04 | 2.09 | 17.8 | 15.8 | 48.7 | 32.6 | 31.1 | 32.2 | 42.7 | 36.7 | 47.4 |
| | ×10$^{+5}$ | | | 46.5 | 37.4 | 67.6 | 43.1 | 43.9 | 36.1 | 48.1 | 40.9 | 50.5 |
| CO$_2$/N$_2$ | ×10$^{+10}$ | 4.74 | 5.07 | 15.2 | 15.4 | 23.1 | 20.7 | 17.5 | 17.6 | 19.2 | 27.8 | 17.7 |
| | ×10$^{+5}$ | | | 31.8 | 31.8 | 30.5 | 26.2 | 22.7 | 19.2 | 21.1 | 30.6 | 18.9 |
| H$_2$/N$_2$ | ×10$^{+10}$ | 2.39 | 2.40 | 9.30 | 10.7 | 25.6 | 24.7 | 18.0 | 29.2 | 40.6 | 35.0 | 40.7 |
| | ×10$^{+5}$ | | | 33.0 | 66.9 | 62.1 | 61.9 | 43.2 | 45.8 | 79.9 | 47.5 | 52.9 |

[1] ×10$^{-4}$
[2] Selectivity based on permeability coefficient ($\overline{P}$) of the composite membrane
[3] Selectivity based on permeance (P/l) of the fluorinated surface layer
[4] Very large The results reported in Tables 3 and 4 above for the gas permeability and selectivity tests, show a significant increase in membrane selectivity of the fluorinated membranes for all seven gas mixtures tested. For example, the O$_2$/N$_2$ selectivity ratio of the PTMSP membrane showed over a two-fold increase for the membrane when fluorinated with 0.1% F$_2$ gas for 5 minutes, and over a three-fold increase for the membrane when fluorinated with 0.1% F$_2$ for 15 minutes. The largest selectivity increase was exhibited by the PTMSP membranes which were fluorinated with a 0.5% fluorine gas for 60 minutes, although a significant selectivity increase was observed even with the membranes which were fluorinated with only 0.1% fluorine gas. Table 3 also shows that PTMSP membranes, when fluorinated under the proper conditions, maintain good permeability characteristics while increasing selectivity.

EXAMPLE 2

The fluorination techniques used to treat the polytrimethyl silyl propyne polymers were also used to treat silicone rubber and poly 2-nonyne polymers.

Silicone rubber which is a crosslinked polymer having the general structural formula:

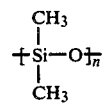

when formed into a membrane has been shown to be very permeable for many gases yet exhibits relatively low selectivities. A 5 mil thick membrane of commercial silicone rubber (MEM-100, lot 190 B-163, manufactured by General Electric Comany) was fluorinated with a gas stream containing 0.5% $F_2$ gas for 45 minutes. The permeabilities and selectivities for various gases were tested for both the fluorinated membrane and an unfluorinated membrane. Gas permeability values and surface analysis data for the fluorinated and unfluorinated membranes are reported in Table 5 below.

TABLE 5

| | Silicone Rubber Membranes | |
|---|---|---|
| | Unfluorinated | Fluorinated |
| $\underline{P}$ | | |
| Helium | 300 | 291 |
| Oxygen | 500 | 462 |
| Nitrogen | 250 | 183 |
| Methane | 800 | 523 |
| Surface Analysis by ESCA | | |
| % C | 50.8 | 53.4 |
| % O | 27.3 | 19.4 |
| % Si | 21.9 | 0.6 |
| % F | — | 26.4 |

The above permeability coefficient and surface analysis data indicate that the silicone rubber membrane is fluorinated, but that surface fluorination did not have a significant effect on permeability or selectivity of the membrane for the gases tested. Additionally, the fluorinated membrane eroded over time, making this polymer unsuitable for surface fluorination.

A sample of poly 2-nonyne was polymerized using a mixed $MoCl_5/P(Ph)_4$ catalyst system. The resulting polymer, having the general structural formula:

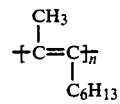

was formed into a dense membrane and treated with a $F_2/N_2$ gas stream comprising 0.5% $F_2$ gas for 15 minutes. Fluorinated and unfluorinated membrane samples were tested for permeability and selectivity for various gases, and a surface analysis was performed on both samples. The results of the tests and analyses are reported in Table 6 below.

TABLE 6

| | Poly 2-nonyne Membranes | |
|---|---|---|
| | Unfluorinated | Fluorinated |
| $\underline{P}$ | | |
| Oxygen | 54.1 | 52.0 |
| Nitrogen | 17.9 | 21.8 |
| Helium | 70.3 | 62.0 |
| $\underline{\alpha}$ | | |
| $O_2/N_2$ | 3.0 | 2.4 |
| $He/N_2$ | 3.9 | 2.8 |
| $He/O_2$ | 1.3 | 1.2 |
| Surface Analysis by ESCA | | |
| % C | 94.5 | 43.7 |
| % O | 5.0 | 6.2 |
| % F | — | 49.8 |

The poly-2-nonyne membrane, when treated with an $F_2/N_2$ reactive mixture, exhibited a highly fluorinated surface, but demonstrated no significant change in either permeability coefficient or selectivity for the gases tested.

The results of the above examples demonstrates the importance of both the basic polymer structure and the fluorination step in synthesizing a membrane having both high permeability and high selectivity for a wide range of gas mixtures.

Having this described the present invention, what is now deemed appropriate for Letters Patent is set out in the following appended claims.

What is claimed is:

1. A process for separating a feed gas mixture containing at least two components, said process comprising bringing said feed gas mixture into contact with a treated, semi-permeable, polymeric membrane comprising a polymer, cast into membrane form, having the general structural formula:

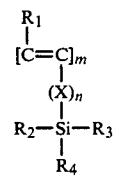

wherein $R_1$ is a linear or branched $C_1$–$C_4$ alkyl group; $R_2$ and $R_3$ are independently linear or branched $C_1$–$C_6$ alkyl groups; $R_4$ is a linear or branched $C_1$–$C_{12}$ alkyl or aryl group; X is a $C_1$–$C_3$ alkyl group or

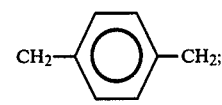

m is at least 100; and n is 0 or 1, which has been treated with a reactive source of fluorine for a time sufficient to modify the membrane such that the $O_2/N_2$ selectivity ratio of the membrane is increased by at least 50% over that of the membrane prior to treatment with the reactive elemental fluorine source.

2. A process in accordance with claim 1 wherein the reactive elemental fluorine source is a gas stream containing between 0.01–25% fluorine gas.

3. A process in accordance with claim 2 wherein the reactive elemental fluorine source is a gas stream containing between 0.1–2% fluorine gas.

4. A process in accordance with claim 1 wherein said treated, semi-permeable, polymeric membrane has been contacted with a reactive source of elemental fluorine for a period of time between 10 seconds and 24 hours.

5. A process in accordance with claim 4 wherein said treated, semi-permeable, polymeric membrane has been contacted with a reactive source of elemental fluorine for a period of time between 0.5 min and 120 min.

6. A process in accordance with claim 1 wherein said feed gas mixture is brought into contact with a treated, semi-permeable, polymeric membrane comprising a polymer, cast into membrane form, having a structural formula wherein n=0.

7. A process in accordance with claim 6 wherein said feed gas mixture is brought into contact with a treated, semi-permeable, polymeric membrane comprising a polymer, cast into membrane form, having a structural formula wherein $R_1$, $R_2$ and $R_3$ are $CH_3$ groups and $R_4$ is a linear or branched $C_1$–$C_{12}$ alkyl group.

8. A process in accordance with claim 7 wherein said feed gas mixture is brought into contact with a treated, semi-permeable, polymeric membrane comprising a polymer, cast into membrane form, having the structural formula:

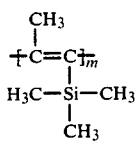

wherein m is at least 100.

9. A process in accordance with claim 1 wherein the feed gas mixture is selected from the group consisting of: $O_2/N_2$, $He/CH_4$, $H_2/CH_4$, $H_2/CO$, $CO_2/CH_4$, $CO_2/N_2$ and $H_2/N_2$.

10. A treated, semi-permeable, polymeric membrane having improved selectivity for use in separating components of a feed gas mixture, said membrane comprising a polymer, cast into membrane form, having the general structural formula:

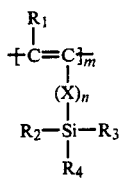

wherein $R_1$ is a linear or branched $C_1-C_4$ alkyl group; $R_2$ and $R_3$ are independently linear or branched $C_1-C_6$ alkyl groups; $R_4$ is a linear or branched $C_1-C_{12}$ alkyl or aryl group; X is a $C_1-C_3$ alkyl group or

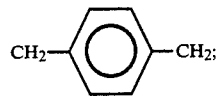

m is at least 100; and n is 0 or 1, which has been treated with a reactive source of flourine for a time sufficient to modify the membrane such that the $O_2/N_2$ selectivity ratio of the membrane is increased by at least 50% over that of the membrane prior to treatment with the reactive elemental fluorine source.

11. A treated, semi-permeable, polymeric membrane in accordance with claim 10 wherein the reactive elemental fluorine source is a gas stream containing between 0.01-25% fluorine gas.

12. A treated, semi-permeable, polymeric membrane in accordance with claim 11 wherein the reactive elemental fluorine source is a gas stream containing between 0.1-2% fluorine gas.

13. A trreated, semi-permeable, polymeric membrane in accordance with claim 10 which has been contacted with a reactive source of elemental fluorine for a period of time between 10 seconds and 24 hours.

14. A treated, semi-permeable, polymeric membrane in accordance with claim 13 which has been contacted with a reactive source of elemental fluorine for a period of time between 0.5 min and 120 min.

15. A treated, semi-permeable, polymeric membrane in accordance with claim 10 wherein said polymer cast into membrane form has a structural formula wherein n=0.

16. A treated, semi-permeable, polymeric membrane in accordance with claim 10 wherein said polymer cast into membrane form has a structural formula wherein $R_1$, $R_2$ and $R_3$ are $CH_3$ groups and $R_4$ is a linear or branched $C_1-C_{12}$ alkyl group.

17. A treated, semi-permeable, polymeric membrane in accordance with claim 16 wherein said polymer cast into membrane form has a structural formula wherein n=0.

18. A treated, semi-permeable, polymeric membrane in accordance with claim 10 in which the polymer cast into membrane form has the following structural formula:

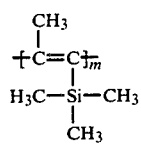

wherein m is at least 100.

19. A membrane in accordance with claim 10 wherein the polymer is cast into the form of an asymmetric membrane having a thin dense layer over a porous layer.

20. A membrane in accordance with claim 10 wherein the polymer, prior to treatment with a reactive source of elemental fluorine, is first coated onto the surface of a porous substrate.

21. A membrane in accordance with claim 20 wherein the porous substrate is in the form of a flat sheet or hollow fiber prior to being coated.

22. A membrane in accordance with claim 20 wherein the porous substrate is a polyolefin.

23. A membrane in accordance with claim 20 wherein the porous substrate is polyethylene or polypropylene.

24. A method of producing a semi-permeable, polymeric membrane having improved selectivity for use in separating components of a feed gas mixture, said method comprising:
  (1) casting into membrane form a polymer having the general structural formula:

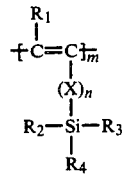

wherein $R_1$ is a linear or branched $C_1-C_4$ alkyl group; $R_2$ and $R_3$ are independently linear or branched $C_1-C_6$ alkyl groups; $R_4$ is a linear or branched $C_1-C_{12}$ alkyl or aryl group; X is a $C_1-C_3$ alkyl group or

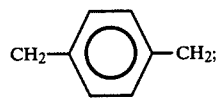

m is at least 100; and n is 0 or 1; and
  (2) treating said polymer in membrane form with a reactive source of fluorine for a time sufficient to modify the membrane such that the $O_2/N_2$ selectivity ratio of the membrane is increased by at least 50% over that of the membrane prior to treatment with the reactive elemental fluorine source.

25. A method in accordance with claim 24 wherein the reactive source of elemental fluorine is a gas stream containing between 0.01-25% fluorine gas.

26. A method in accordance with claim 25 wherein the polymer in membrane form is treated with a reactive source of elemental fluorine for a period of time between 10 seconds and 24 hours.

27. A method in accordance with claim 24 wherein the polymer cast into membrane form has the general structural formula wherein $R_1$, $R_2$ and $R_3$ are $CH_3$ groups, $R_4$ is a linear or branched $C_1$-$C_{12}$ alkyl group and $n=0$.

28. A method in accordance with claim 24 wherein the polymer cast into membrane form has the following structural formula:

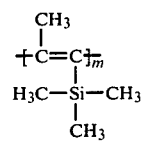

wherein m is at least 100.

29. A method in accordance with claim 24 wherein said polymer in membrane form is treated with a reactive source of elemental fluorine under ambient conditions of temperature and pressure.

* * * * *

UNITED STATES PATENT AND TRADEMARK OFFICE
CERTIFICATE OF CORRECTION

PATENT NO. : 4,657,564

DATED : April 14, 1987

INVENTOR(S) : Michael Langsam

It is certified that error appears in the above-identified patent and that said Letters Patent is hereby corrected as shown below:

Columns 7-8, Table 4
    Delete in its entirety 2nd column from left

Columns 7-8, Table 4, Column "A", Line 35
    Insert superscript (2) across entire line beginning with Column "A", (i.e., $1.51^{(2)}$, $1.47^{(2)}$, etc.

Columns 7-8, Table 4, Column "1", Line 36
    Insert superscript (3) across entire line beginning with Column "1", (i.e., $4.53^{(3)}$, $4.70^{(3)}$, etc.

Signed and Sealed this

Twenty-seventh Day of March, 1990

Attest:

JEFFREY M. SAMUELS

Attesting Officer

Acting Commissioner of Patents and Trademarks